(12) United States Patent
Kang et al.

(10) Patent No.: US 11,617,258 B2
(45) Date of Patent: Mar. 28, 2023

(54) WELDING QUALITY PROCESSING METHOD AND DEVICE, AND CIRCUIT BOARD

(71) Applicant: BEIJING XIAOMI MOBILE SOFTWARE CO., LTD., Beijing (CN)

(72) Inventors: Zhenya Kang, Beijing (CN); Jinbao Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 38 days.

(21) Appl. No.: 17/355,917

(22) Filed: Jun. 23, 2021

(65) Prior Publication Data

US 2022/0312585 A1 Sep. 29, 2022

(30) Foreign Application Priority Data

Mar. 29, 2021 (CN) .................. 202110336125.1

(51) Int. Cl.
*B23K 31/00* (2006.01)
*H05K 1/02* (2006.01)
(Continued)

(52) U.S. Cl.
CPC ......... *H05K 1/0271* (2013.01); *B23K 1/0016* (2013.01); *B23K 3/08* (2013.01); *B23K 31/125* (2013.01); *G06F 30/20* (2020.01); *H05K 1/0298* (2013.01); *H05K 3/3494* (2013.01); *B23K 2101/42* (2018.08); *G06F 2115/12* (2020.01)

(58) Field of Classification Search
CPC .. H05K 1/0271; H05K 1/0298; H05K 3/3494; H05K 3/0005; H05K 3/3436; H05K 2201/049; H05K 2201/09136; H05K 3/34; B23K 1/0016; B23K 3/08; B23K 2101/42; B23K 31/12–125; G06F 30/20;
(Continued)

(56) References Cited

U.S. PATENT DOCUMENTS 10,194,537 B2 * 1/2019 Chamberlin ......... H05K 3/4611
2008/0057630 A1 * 3/2008 Modi .................. H05K 3/4602
257/E23.174

(Continued)

FOREIGN PATENT DOCUMENTS

CN 1210585 A * 3/1999 ............. G01B 11/30
CN 101479730 A * 7/2009 ......... G06F 17/5009
(Continued)

OTHER PUBLICATIONS

European Patent Application No. 21182672.2 extended Search and Opinion dated Dec. 13, 2021, 8 pages.
(Continued)

*Primary Examiner* — Kiley S Stoner
(74) *Attorney, Agent, or Firm* — Cozen O'Connor (57) ABSTRACT

A welding quality processing method and device, and a circuit board. The method includes: obtaining warpage data of each circuit board layer in a multi-layer circuit board under a preset welding temperature change curve; performing simulation according to a stacked state of the multi-layer circuit board and the warpage data to generate a warpage level of each region in the multi-layer circuit board in the stacked state; and processing the multi-layer circuit board according to the warpage level.

10 Claims, 3 Drawing Sheets

(51) Int. Cl.
*G06F 30/20* (2020.01)
*B23K 1/00* (2006.01)
*B23K 3/08* (2006.01)
*H05K 3/34* (2006.01)
*B23K 31/12* (2006.01)
*B23K 101/42* (2006.01)
*G06F 115/12* (2020.01)

(58) Field of Classification Search
CPC ............ G06F 2115/12; G06F 2119/08; G01B 11/306; G01B 11/254; G06Q 10/0635
USPC ...................................... 228/102–105, 8–12
See application file for complete search history.

(56) References Cited

U.S. PATENT DOCUMENTS

| | | | | |
|---|---|---|---|---|
| 2009/0052835 | A1* | 2/2009 | Okazaki | H05K 3/4688 385/14 |
| 2009/0310848 | A1* | 12/2009 | Dang | G06F 30/23 382/145 |
| 2009/0312960 | A1* | 12/2009 | Dang | G06F 30/23 702/42 |
| 2010/0023299 | A1* | 1/2010 | Kubota | H05K 3/0005 702/167 |
| 2010/0116530 | A1* | 5/2010 | Okazaki | H05K 3/4688 174/250 |
| 2014/0182895 | A1* | 7/2014 | Lee | H05K 1/0271 174/251 |
| 2016/0165714 | A1* | 6/2016 | Chen | H05K 3/4602 174/250 |
| 2017/0142825 | A1* | 5/2017 | Hada | G01B 21/20 |
| 2017/0351783 | A1* | 12/2017 | Call | G06F 30/20 |
| 2019/0013225 | A1* | 1/2019 | Taguchi | G01B 11/306 |
| 2021/0256666 | A1* | 8/2021 | Tsuruda | G06T 3/0093 |
| 2021/0296204 | A1* | 9/2021 | Yumoto | H05K 1/0271 |

FOREIGN PATENT DOCUMENTS

| | | | | |
|---|---|---|---|---|
| CN | 101849284 | A * | 9/2010 | ........... H05K 1/0271 |
| CN | 102065640 | A | 5/2011 | |
| CN | 106247967 | A * | 12/2016 | ........... G01B 11/161 |
| CN | 107799451 | A * | 3/2018 | ......... G03F 7/70525 |
| CN | 111758302 | A * | 10/2020 | ........... B23K 1/0016 |
| CN | 112560318 | A * | 3/2021 | |
| CN | 113158368 | A * | 7/2021 | ............. G06F 30/17 |
| KR | 20090127427 | A | 12/2009 | |
| KR | 20140088000 | A * | 7/2014 | |
| TW | 201444427 | A * | 11/2014 | ........... H05K 1/0271 |
| WO | WO-2010021287 | A1 * | 2/2010 | ........... G06F 17/5009 |
| WO | WO-2010103723 | A1 * | 9/2010 | ....... H01L 23/49827 |
| WO | WO-2019022101 | A1 * | 1/2019 | ............. B29C 43/20 |
| WO | WO-2020149118 | A1 * | 7/2020 | ......... G02B 27/0012 |

OTHER PUBLICATIONS

Zwemer, D. et al. "PWB Warpage Analysis and Verification using an AP210 Standards-based Engineering Framework and Shadow Moire"; 5$^{th}$ Int. Conf. on Thermal and Mechanical Simulation and Experiments in Micro-electronics and Micro-Systems; May 2004; pp. 121-131.

Bajaj, M.; Zwemer, D. et al. "Automating Thermo-Mechanical Warpage Estimation of PCBs/ PCAs using a Design-Analysis Integration Framework", May 1, 2006; 2006 User2User; 43 pages.

Chinese Patent Application No. 202110336125.1 Office Action dated Dec. 3, 2021, 6 pages.

Chinese Patent Application No. 202110336125.1 English translation of Office Action dated Dec. 3, 2021, 4 pages.

\* cited by examiner

WELDING QUALITY PROCESSING METHOD AND DEVICE, AND CIRCUIT BOARD

CROSS-REFERENCE TO RELATED APPLICATIONS

This application claims priority to and benefits of Chinese Patent Application Serial No. 202110336125.1, filed with the National Intellectual Property Administration of P. R. China on Mar. 29, 2021, the entire content of which is incorporated herein by reference.

TECHNICAL FIELD

The present disclosure generally relates to the field of welding technology, and more particularly, to a welding quality processing method and device, and a circuit board.

BACKGROUND

With the rapid development of 5G technology, there are more and more components in mobile terminals. In order to stack the components within a limited space, stacking multi-layer circuit board is becoming more and more common to leave more installation space for battery or other functional modules of electronic devices. The multi-layer circuit boards, such as sandwich structured circuit boards, are usually composed of a bottom board, an adapter board and a top board, and the components are welded on the circuit board. However, warpage may occur on the circuit board during a reflow welding process. Since warpage may destroy the structure of the circuit board, and the degree of warpage can only be judged thereafter through measurement, it is difficult to discover internal defects of the circuit board in time, which affects the yield of the circuit boards in the corresponding batch.

SUMMARY

The present disclosure provides a welding quality processing method and device, and a circuit board.

According to a first aspect of embodiments of the present disclosure, there is provided a welding quality processing method, including:

obtaining warpage data of each circuit board layer in a multi-layer circuit board under a preset welding temperature change curve;

performing simulation according to a stacked state of the multi-layer circuit board and the warpage data to generate a warpage level of each region in the multi-layer circuit board in the stacked state;

processing the multi-layer circuit board according to the warpage level.

According to a second aspect of embodiments of the present disclosure, there is provided a welding quality processing device, including:

an acquisition module, configured to obtain warpage data of each circuit board layer in a multi-layer circuit board under a preset welding temperature change curve;

a simulation module, configured to perform simulation according to a stacked state of the multi-layer circuit board and the warpage data to generate a warpage level of each region in the multi-layer circuit board in the stacked state;

a processing module, configured to process the multi-layer circuit board according to the warpage level.

According to a third aspect of embodiments of the present disclosure, there is provided a circuit board. The circuit board is formed by stacking multiple circuit board layers, and the circuit board is processed according to the above-mentioned method.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar components unless otherwise represented. The implementations set forth in the following description of exemplary embodiments do not represent all implementations consistent with the invention. Instead, they are merely examples of device, apparatuses and methods consistent with aspects related to the invention as recited in the appended claims.

According to a first aspect of embodiments of the present disclosure, there is provided a welding quality processing method, including:

obtaining warpage data of each circuit board layer in a multi-layer circuit board under a preset welding temperature change curve;

performing simulation according to a stacked state of the multi-layer circuit board and the warpage data to generate a warpage level of each region in the multi-layer circuit board in the stacked state;

processing the multi-layer circuit board according to the warpage level.

In some embodiments, the welding temperature change curve includes one or more of a heating stage curve, a heat preservation stage curve, a welding stage curve, and a cooling stage curve, and the method further includes: acquiring warpage data corresponding to temperature characteristic points of the welding temperature change curve. The number of the temperature characteristic points acquired in the welding stage curve is greater than that of the temperature characteristic points acquired in the heat preservation stage curve.

In some embodiments, obtaining the warpage data of each circuit board layer in the multi-layer circuit board includes: obtaining a shadow moire distribution diagram of the multi-layer circuit board under a grating through a shadow moire technique, and calculating a relative vertical displacement of the multi-layer circuit board during a welding process according to the shadow moire distribution diagram.

In some embodiments, the method includes fitting warpage data of object points matched in the stacked state, including:

determining warpage data of corresponding object points of two circuit board layers in a vertical direction in the stacked state; and fitting and superimposing relative vertical displacements in the warpage data to form a fitting surface.

In some embodiments, the method further includes obtaining a relative value by comparing the relative vertical displacement of the fitting surface with a reference value, and generating the warpage level of each region of the multi-layer circuit board in the stacked state according to a correspondence between the relative value and a first threshold interval.

In some embodiments, the multi-layer circuit board includes a bottom board, an adapter board, and a top board. The multi-layer circuit board is stacked in a sequence of attaching an upper surface of the adapter board to the top board, and attaching a lower surface of the adapter plate to the bottom board.

In some embodiments, the method further includes obtaining the warpage data by inputting welding simulation parameters and mapping. The welding simulation parameters include one or more of a thickness of each circuit board layer, a distance between circuit board layers of the multi-layer circuit board, a material of the multi-layer circuit board, an area of the multi-layer circuit board, and a coverage area of a copper foil.

In some embodiments, obtaining the warpage data of each circuit board layer of the multi-layer circuit board further includes: obtaining a preliminarily screened region where the warpage data of each circuit board layer is greater than a preset second threshold, and simulating the preliminarily screened region.

In some embodiments, processing the multi-layer circuit board according to the warpage level includes adjusting design parameters of the multi-layer circuit board. The design parameters of the multi-layer circuit board include one or more of: a residual copper rate of the multi-layer circuit board; a relative position of the multi-layer circuit board; a material of the multi-layer circuit board; and a welding position of a component of the multi-layer circuit board.

According to a second aspect of embodiments of the present disclosure, there is provided a welding quality processing device, including:

an acquisition module, configured to obtain warpage data of each circuit board layer in a multi-layer circuit board under a preset welding temperature change curve;

a simulation module, configured to perform simulation according to a stacked state of the multi-layer circuit board and the warpage data to generate a warpage level of each region in the multi-layer circuit board in the stacked state;

a processing module, configured to process the multi-layer circuit board according to the warpage level.

In some embodiments, the welding temperature change curve includes one or more of a heating stage curve, a heat preservation stage curve, a welding stage curve, and a cooling stage curve. The acquisition module is further configured to acquire warpage data corresponding to temperature characteristic points of the welding temperature change curve, and the number of the temperature characteristic points acquired in the welding stage curve is greater than that of the temperature characteristic points acquired in the heat preservation stage curve.

In some embodiments, the acquisition module further includes a measurement module. The measurement module is configured to obtain the warpage data of each circuit board layer in the multi-layer circuit board by obtaining a shadow moire distribution diagram of the multi-layer circuit board under a grating through a shadow moire technique, and calculating a relative vertical displacement of the multi-layer circuit board during a welding process according to the shadow moire distribution diagram.

In some embodiments, the simulation module is configured to fit warpage data of object points matched in the stacked state by determining warpage data of corresponding object points of two circuit board layers in a vertical direction in the stacked state, and fitting and superimposing relative vertical displacements in the warpage data to form a fitting surface.

In some embodiments, the device further includes the measurement module. The measurement module is configured to obtain the shadow moire distribution diagram of the multi-layer circuit board under the grating through the shadow moire technique, and calculate the relative vertical displacement of positions of the multi-layer circuit board during the welding process according to the shadow moire distribution diagram.

In some embodiments, the simulation module is configured to obtain a relative value by comparing the relative vertical displacement of the fitting surface with a reference value, and generate the warpage level of each region of the multi-layer circuit board in the stacked state according to a correspondence between the relative value and a first threshold interval.

In some embodiments, the processing module is configured to process the multi-layer circuit board according to the warpage level by adjusting design parameters of the multi-layer circuit board. The design parameters of the multi-layer circuit board include one or more of: a residual copper rate of the multi-layer circuit board; a relative position of the multi-layer circuit board; a material of the multi-layer circuit board; and a welding position of a component of the multi-layer circuit board.

According to a third aspect of embodiments of the present disclosure, there is provided a circuit board. The circuit board is formed by stacking multiple circuit board layers, and the circuit board is processed according to the above-mentioned method.

In some embodiments, a surface of one or more layers of the circuit board where a component is welded is covered with a copper foil, and an area and/or a coverage region of the copper foil is not equal.

The technical solutions provided by the embodiment of the present disclosure have the advantages as follows.

In embodiments of the present disclosure, by simulating the welding process of the multi-layer circuit board in the stacked state, the warpage level of the circuit board during the welding process may be obtained before the actual welding, and the warpage risk may be judged, such that the warpage risk may be dynamically analyzed, and the circuit board may be processed based on the warpage level to guarantee the welding quality of the circuit board.

Figure 1:
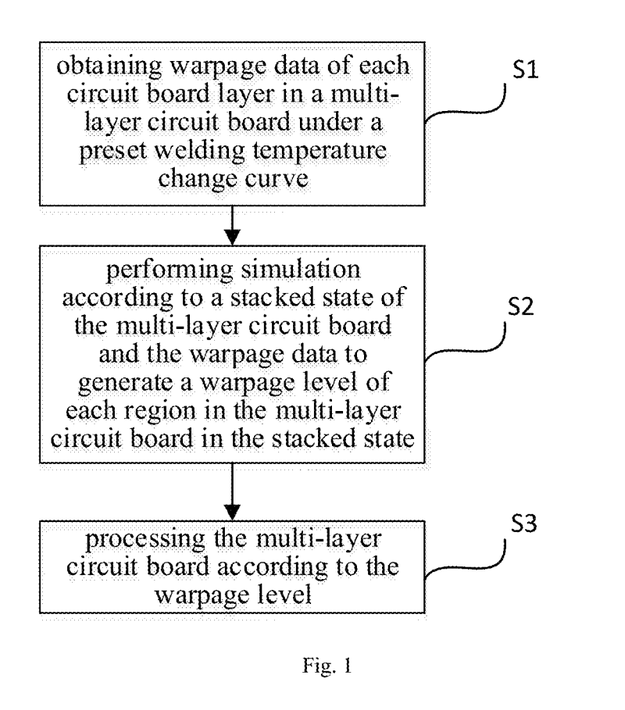
FIG. 1 is a flow chart illustrating a welding quality processing method according to some embodiments of the present disclosure.

FIG. 1 is a flow chart illustrating a welding quality processing method according to some embodiments of the present disclosure. As shown in FIG. 1, the method includes steps as follows.

In step S1, warpage data of each circuit board layer in a multi-layer circuit board is obtained under a preset welding temperature change curve.

In step S2, simulation is performed according to a stacked state of the multi-layer circuit board and the warpage data to generate a warpage level of each region in the multi-layer circuit board in the stacked state.

In step S3, the multi-layer circuit board is processed according to the warpage level.

Figure 2:
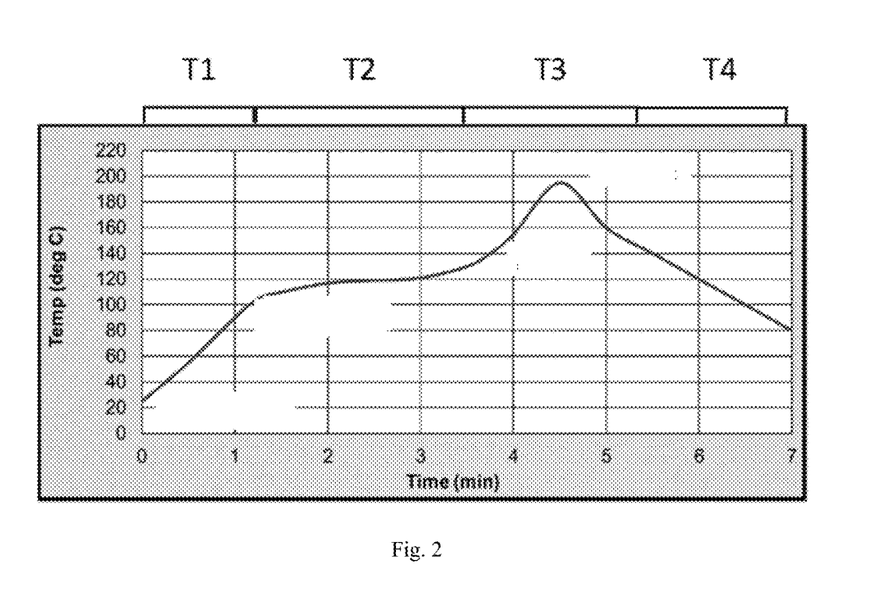
FIG. 2 is a graph illustrating a welding temperature change curve according to some embodiments of the present disclosure.

In order to simulate a warpage degree of the multi-layer circuit board in a welding process, a certain environmental conditions need to be preset to obtain the warpage data of each circuit board layer in the multi-layer circuit board. Therefore, it is necessary to determine the welding temperature change curve corresponding to the welding process in advance and input certain condition information. In step S1, the welding temperature change curve is obtained. Taking reflow welding of a circuit board as an example, as shown in FIG. 2, a temperature change curve of a complete reflow welding process normally includes T1 to T4 zones as follows. The T1 zone is a preheating zone, which denotes a heating stage. In this stage, the circuit board is heated by a welding table. In this zone, the temperature rises slowly, such that a part of solvents and water in a solder paste is volatilized in time, and electronic components (especially IC components) are slowly warmed up to adapt to the subsequent high temperature. Since the components on the surface of the PCB (Printed Circuit Board) have different sizes and different heat absorption capacity, the heating rate needs to be controlled to avoid uneven temperature inside and outside the components or between different components. For example, in an embodiment, heating is performed from room temperature to 100° C. at a rate of 1 to 3° C. per second. The T2 zone is an infiltrating zone, which denotes a heat preservation stage. In this stage, the solder paste is at the beginning of melting, volatiles in the solder paste will be further removed, activators such as flux begin to work to effectively remove oxides on the welding surface, and the temperature is maintained for a certain period of time to make the entire circuit board reach a uniform temperature state. For example, in an embodiment, the temperature is kept in the range of 100° C. to 120° C. for 60 to 100 seconds. The T3 zone is a reflow welding zone, which denotes a welding stage. In this stage, heating continues and the solder paste is heated to a melting temperature TAL (Time Above Liquids) to weld corresponding components. For example, in an embodiment, the temperature is raised higher than 151° C. for 80 to 120 seconds, and briefly reaches a peak temperature in a range of 190° C. to 200° C. The T4 zone is a cooling zone, which denotes a cooling stage. In this stage, the product is cooled and welding joints are solidified, which make preparations for the subsequent assembly process of PCBA (Printed Circuit Board Assembly). It is also critical to control the cooling rate, if the cooling rate is too fast, the assembly may be damaged, if the cooling rate is too slow, the TAL time may be increased to cause fragile welding joints. In order to perform accurate simulation, the temperature curve needs to be set. It is understood that there should be a margin for temperature change when setting the temperature curve. For example, a fluctuation of +3° C. may present between the simulated temperature curve and the preset temperature curve to match a temperature deviation in actual production environment, such that the simulation effect may cover the temperature variation range of the actual production environment.

After the welding temperature change curve is obtained, it is also necessary to obtain the warpage data corresponding to the temperature change curve of each circuit board layer in the multi-layer circuit board. That is, when the multi-layer circuit board is subjected to the corresponding temperature change during the welding process, the warpage data of each region of each circuit board layer at each time point is obtained. It is understood that the warpage data may be obtained by non-contact measurement technology. By simulating and physically building a reflow welding process and operating environmental conditions, a complete historical warpage displacement performance is captured to obtain more realistic warpage data. It is also possible to input specific parameters of the corresponding circuit board and set specific environmental conditions to obtain the warpage data through simulation.

For example, in some embodiments, the warpage data of the multi-layer circuit board may be obtained by a shadow moire technique. The shadow moire technique is a technique for judging a surface state of a sample based on geometric interference between a reference grating and its shadow on a surface of the sample. When light passes through the reference grating at a certain oblique angle, the shadow of the reference grating is also cast on the sample. The shadow will distort due to the uneven surface of the sample. When viewing the shadow grating through the actual grating at different angles, the shadow grating and the actual grating are superimposed to form interference fringes that may be used to characterize the deformation of the surface of the sample. If the sample is flat, no moire pattern is observed. However, when the surface of the sample is not flat, a series of light and dark stripes (i.e., moire) may be observed. In some embodiments, a simulated reflow welding process and operating environmental conditions may be set up in advance, and a complete historical warpage displacement performance may be captured in the reflow welding process of the circuit board using the shadow moire technique, thereby obtaining the warpage data of each circuit board layer during the reflow welding process.

At the same time, given the large scale of the simulation data, the amount of the data may be reduced by selecting warpage characteristic points. For example, the area of the circuit board is equally divided into 100 square regions, and only the warpage data at a center point of each square region is obtained to reduce the amount of the simulation data. It is understood that other alternative ways of reducing the amount of data may be selected by the person skilled in the art according to actual needs.

Figure 3:
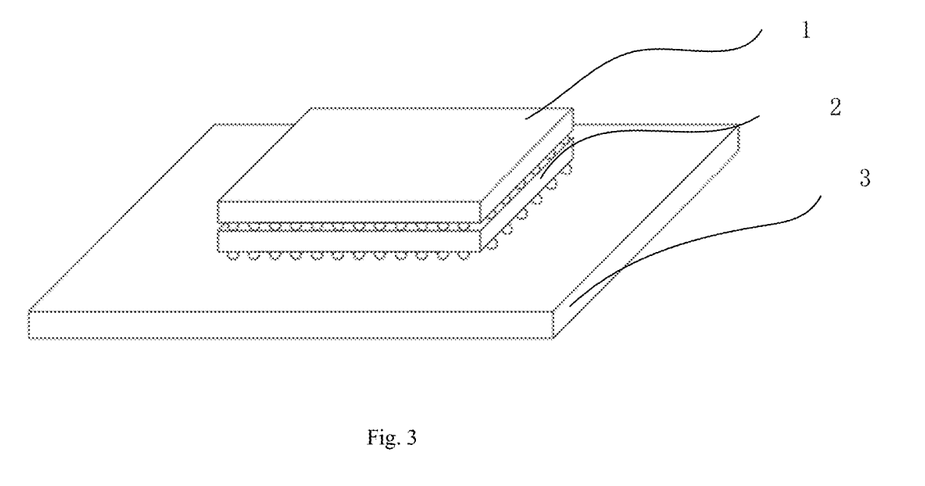
FIG. 3 is a schematic diagram illustrating a stake state of a circuit board according to some embodiments of the present disclosure.

As embodiments of the present disclosure relate to the judgment on the comprehensive warpage risk of the multi-layer circuit board in the stacked state, in step S2, it is necessary to perform simulation according to the stacked state of the multi-layer circuit board and the warpage data to generate the warpage level of each region in the multi-layer circuit board in the stacked state. The warpage data corresponding to the temperature change curve of the multi-layer circuit board is superimposed according to the stacked state. In embodiments of the present disclosure, the stacked state includes respective stacking processes of the respective circuit board layers. For example, a sandwich structured circuit board as shown in FIG. 3 includes a top board 1, an adapter board 2 and a bottom board 3. The stacking process of the sandwich structured circuit board includes: printing tin on one surface of the top board 1, attaching components thereto, and performing reflow welding; and then performing two-in-one attachment with the corresponding adapter board 2, followed by another reflow welding to fix the top board 1 and the adapter board 2 together. At the same time, front and back surfaces of the bottom board 3 may also be attached with components by the reflow welding. Then, the two-in-one circuit board may be attached with the bottom board 3 through one surface of the adapter plate 2 to form a three-in-one circuit board. In this state, the three-in-one circuit board is further fixed by another reflow welding to form a final three-in-one circuit board. Thus, since the multi-layer circuit board is stacked by more than one times reflow welding, the warpage in the welding process is more prone to affect the quality of the circuit board. Once the warpage occurs in a certain layer of the circuit board, welded components may be loosened due to distortion, and for unwelded components, due to too large warpage, the corresponding solder paste cannot be well melted in the fixed region to result in cold solder joint or empty solder. It is understood that the present disclosure is not limited to the sandwich structured circuit board, and the warpage risk of a circuit board with two or more layers can also be judged according to the method of the present disclosure. Further, it is understood that the number of planes welded with components and the times of reflow welding the circuit board suffered are also not specifically limited in the present disclosure, and may be suitably determined by the person skilled in the art according to the actual needs.

After the data is simulated, fitting data after may be obtained, which is the superposition of the warpage data of the multi-layer circuit board. The fitting way may be to superimpose a relative vertical displacement of the multi-layer circuit board in a selected region to obtain a superimposed warpage degree. The fitting data reflects the warpage risk of the stacked state of the circuit board during the reflow welding process. The obtained processing result may be compared with a set standard to generate the warpage level of the multi-layer circuit board in the stacked state. For example, when the warpage value is below 80 µm, a low-risk level is judged, and a low-risk region is marked. When the warpage value is between 80 µm and 120 µm, a middle-risk level is judged, and a middle-risk region is marked, which indicates that there is a certain risk, the quality of the circuit board may be remedied by adjusting the coverage region and coverage area of copper foil via technological means, such as clamp pressing. When the warpage value is larger than 120 µm, a high-risk level is e judged, and a high-risk region is marked, which indicates that such a large warpage degree cannot be remedied, or the required cost is too high. If the reflow welding is performed in this state, the welding joints are prone to cold solder joint or empty solder due to the too large warpage, which makes it difficult to guarantee the quality of the circuit board. At this time, it is necessary to redesign the layout and pattern of the circuit board and adjust the material of the circuit board in an early step, and redesign and modify the high-risk region in a stage previous to the processing stage to avoid the welding risk in this region. After the judgment is completed, the warpage level of each region of the multilayer circuit board in the stacked state is generated. It is understood that the above-mentioned judgment values are only standards for the specific circuit board stack, and and are merely serve as an example for better understanding of the present disclosure. It is understood that the judgment standard will vary depend on different circuit board designs and different reflow welding environments, and thus will not be limited in the present disclosure.

After obtaining the warpage level, the multi-layer circuit board is processed according to the warpage level. For example, a prompt is made for a corresponding region to promote the designer to adjust the parameters. Furthermore, it is also possible to analyze the cause of the warpage level according to the stacked state of the multi-layer circuit board or the obtained welding simulation parameters. For example, possible causes of the warpage may be summarized by machine learning based on historical data to promote the designer to make adjustments. Furthermore, it is also possible to automatically calculate the design parameters. For example, if a residual copper rate in the current region is above 5%, it needs to be adjusted to below 3% to meet the standard. It is understood that the design parameters also include a relative position of the multi-layer circuit board, a material of the multilayer circuit board, and a welding position of a component of the multi-layer circuit board, which are not specifically limited therein.

At the same time, since the simulation can be made for each stage in the temperature curve to obtain the warpage state and judge the warpage level for each temperature state, the entire welding process may be dynamically analyzed according to embodiments of the present disclosure, and the risks in the welding process may be comprehensively grasped.

Through the method according to embodiments of the present disclosure, the warpage level of the circuit board during the welding process may be obtained before the actual welding, and the warpage risk may be judged, such that the warpage risk may be dynamically analyzed, and the circuit board may be processed based on the warpage level to guarantee the welding quality of the circuit board.

In an embodiment of the present disclosure, temperature characteristic points of the welding temperature change curve are acquired, and the simulation is made according to the warpage data corresponding to the temperature characteristic points. Since the simulation time will be lengthened with the increase in the amount of data, and the temperature corresponding to the risk point generally tends to appear in a certain zone, such that it is enough to select several characteristic points from a whole temperature curve to characterize the overall situation. Therefore, several temperature points may be selected from one or more of the heating stage, the heat preservation stage, the welding stage, and the cooling stage. In an embodiment, as shown in FIG. 2, in the heating stage T1, the temperature is raised from room temperature to 100° C., and the points of 30° C. and 50° C. are selected as the characteristic points. In the heat preservation stage T2, the temperature is kept in the range of 100° C. to 120° C. for 60 to 100 seconds, and only the point of 100° C. is selected as the characteristic point since the temperature does not change much and the change rate is slow in the heat preservation stage. In the welding stage T3, the temperature is further raised higher than 151° C. for 80 to 120 seconds, and briefly reaches a peak temperature in a range of 190° C. to 200° C. In this stage, welding actually takes place, the solder paste is in a flowing state, and the area of the solder paste changes. At the same time, the temperature changes rapidly and there are both a heating stage and a cooling stage, such that more characteristic points need to be selected to reflect the actual welding state. Some more dense temperature characteristic points, like 150° C., 180° C., 190° C., 195° C., 200° C., 195° C., 190° C., 180° C., 150° C., etc., may be selected with time changes. In the cooling stage T4, the product is cooled and the welding joints are solidified. In this stage, it is critical to control the cooling rate, if the cooling rate is too fast, the assembly may be damaged, if the cooling rate is too slow, the TAL time may be increased to cause fragile welding joints. Therefore, three points of 100° C., 50° C. and 30° C. are selected as the characteristic points. In addition, since the temperature change stages including such as the heating stage, the welding stage and the cooling stage have a greater impact on the warpage of the circuit board, the number of the temperature characteristic points acquired in the welding stage, the heating stage or the cooling stage is greater than that in the heat preservation stage. Through the collection and analysis of the warpage data corresponding to the above 15 temperature characteristic points, the temperature where the warpage risk occurs in the entire temperature curve and the warpage degree may be well reflected.

It is understood that, in the actual operation, the temperature characteristic points may be merely selected from one or more of the above-mentioned stages T1 to T4, such as the welding stage, to achieve more efficient analysis.

In an embodiment of the present disclosure, the relative vertical displacement of the multi-layer circuit board may be obtained by the steps as follows. A shadow moire distribution diagram of the multi-layer circuit board under a grating is obtained through a shadow moire technique using the build reflow welding process and operating environmental conditions through a shadow moire technique, and the relative vertical displacements of positions of the multi-layer circuit board during the welding process is calculated according to the shadow moire distribution diagram. Details are described in the related embodiments above, and not elaborated herein.

Figure 4:
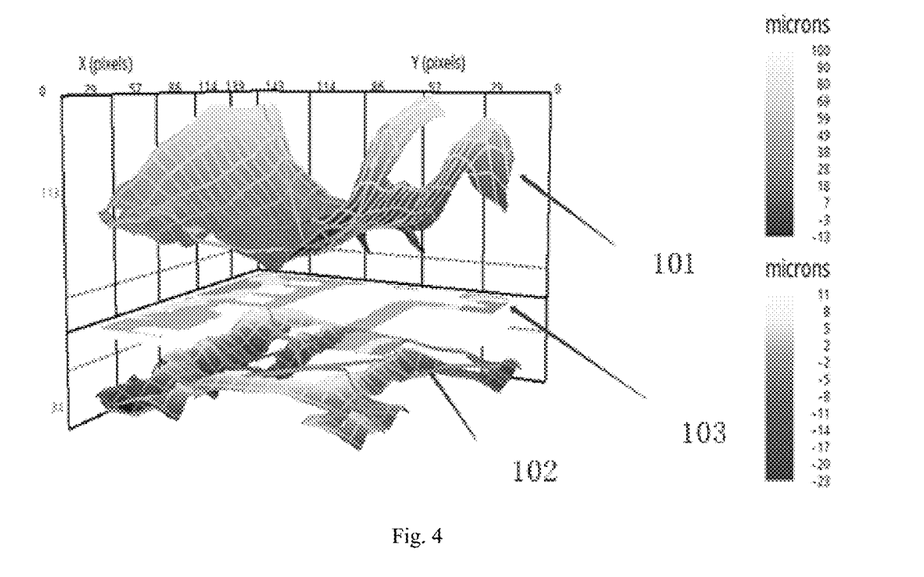
FIG. 4 is a schematic diagram illustrating a software running state of a welding quality processing method according to some embodiments of the present disclosure.

In an embodiment of the present disclosure, the warpage data of the multi-layer circuit board includes the relative vertical displacement of respective positions of the circuit board during the welding process. Although lateral displacements also occur in the warping process, the vertical displacements have a greater impact on the quality of the circuit board. Therefore, in some embodiments, the warpage data of the circuit board includes the relative vertical displacement of the circuit board in the welding process. As shown in FIG. 4, surface 101 and surface 102 show respectively the relative vertical displacements of an upper layer and a lower layer in the circuit board under the same temperature condition. It can be seen that the surface 101 and the surface 102 each have different undulations in different stacking regions, which is an important factor affecting the welding quality, and the relative vertical height may better reflect such undulations.

In an embodiment of the present disclosure, as shown in FIG. 4, in addition to simulating relative vertical displacement surfaces 101 and 102 of object points matched in the stacked state of respective layers of the circuit board, the relative vertical displacements of the surface 101 and the surface 102 at each corresponding point may also be stacked for simulation, the warpage data of the corresponding object points of the two circuit board layers in a vertical direction is determined in the stacked state, and a fitting surface 103 is obtained after the simulation. Among them, the stacking of the data may be the superposition of the relative vertical displacements. It is understood that when the circuit board has more than two layers, the warpage data of two adjacent layers may be superimposed first to obtain a result, and then the warpage data of the third layer may be superimposed to finally obtain the warpage data of the final stacked state.

In an embodiment of the present disclosure, as shown in FIG. 4, when the fitting surface 103 is simulated, each point of the fitting surface 103 represents the warpage data in the stacked state. At this time, an ideal state, such as the warpage value of each circuit board layer being 0, may be used as a reference value for judging the risk. It is understood that the reference values of respective points may also be set by human setting or determined by a machine through learning historical data to be not exactly the same, which is not limited in the present disclosure. The relative value between the reference value and the value of the fitting surface may be obtained after the reference value and the value of the fitting surface are obtained, and the warpage risk of the corresponding point of the fitting surface may be determined according to the relative value to generate the warpage level of the multi-layer circuit board in the stacked state. For example, a relationship between the relative value and a first threshold interval is judged. For example, the first threshold interval is set as a range of 80 μm to 120 μm, if the relative value is below 80 μm, a low-risk level is judged, and a low-risk region is marked; if the relative value is between 80 μm and 120 μm, a medium-risk level is judged, and a medium-risk region is marked; if the relative value is greater than 120 μm, a high-risk level is judged and a high-risk region is marked.

In an embodiment of the present disclosure, as shown in FIG. 4, when the fitting surface 103 is simulated, the corresponding warpage level may be generated, and the warpage level may be visualized with such as different gray scales or different colors, such that a new 3D fitting surface is formed, and the region having the warpage level is output. For example, the region with the high-risk level may be marked in red, the region with the medium-risk level may be marked in yellow, and the region with the low-risk level may be marked in green. Furthermore, the color depth may be one-to-one corresponded to the size of the respective data to form an intuitive view, so that the risk region may be judged more quickly.

In an embodiment of the present disclosure, as shown in FIG. 3, the multi-layer circuit board includes a top board 1, an adapter board 2 and a bottom board 3. The multi-layer circuit board is stacked in a sequence of attaching an upper surface of the adapter board 2 to the top board 1, and attaching a lower surface of the adapter plate 2 to the bottom board 3. In the actual production, since the bottom board 3 generally has a larger and regular shape, there is less risk of warpage in the attachment of the bottom board 3 with the adapter plate 2, and the warpage risk generally occurs in the welding process of the components to the top board 1 and in the attaching process of the adapter board 2 with the top board 1. Therefore, the stacking and attaching sequence of the multi-layer circuit board is limited in embodiments of the present disclosure so as to make the simulation more in line with the actual production situation. It is understood that according to the attaching sequence of embodiments of the present disclosure, the welding process of the components to the top board 1 and the attaching process of the adapter board 2 with the top board 1 may be selected for simulation to further reduce the amount of the data to be processed in the simulation.

In an embodiment of the present disclosure, since the warpage data of the multi-layer circuit board obtained by the shadow moire technique is only the characterization of the warpage state and is affected by various factors in the data acquiring process, the method of the present disclosure may further include the following steps. Before the simulation, welding simulation parameters of the multi-layer circuit board are input to limit the variables, such that the warpage data may be combined with the welding parameters to better complete the welding simulation. The welding parameters include, but are not limited to the following parameters that affect the welding effect: such as one or more of a thickness of each circuit board layer, a distance between circuit board layers of the multi-layer circuit board, a material of the multi-layer circuit board, an area of the multi-layer circuit board, and a coverage area of a copper foil. At the same time, when the kinds of the welding parameters are sufficient enough, the warpage data of the multi-layer circuit board corresponding to the temperature change curve may be obtained without the experiment. This is, there is no need to capture a complete historical warpage displacement performance by simulating and physically building a reflow welding process and operating environmental conditions, but to perform the simulation according to the set conditions to obtain the warpage data of the multi-layer circuit board, and a higher degree of simulation is achieved. Further, the acquisition of the initial data may also be simplified, and the design parameters may be adjusted conveniently in subsequent modifications.

In an embodiment of the present disclosure, since different relative vertical displacements of the warpage may be generated when obtaining the warpage data of each circuit board layer of the multi-layer circuit board, the warpage level of each circuit board layer may be preliminarily screened to obtain a preliminary screened region where the warpage data of each circuit board layer is greater than a preset second threshold, and the preliminary screened region is simulated. For example, the second threshold is preset to a warpage degree of 80 μm, when a certain layer of the circuit board has a region where the warpage data is greater than 80 μm, the region is determined to have a high-risk level and is screened out, and the experimental conditions resulting in the high-risk region are obtained and input into the system for simulation. That is, the initial data is preliminary screened, and the parts that need to be simulated or the parts with high warpage level are screened out before the multi-layer circuit board is superimposed, thereby further reducing the amount of data to be processed.

It should be understood that in multi-layer circuit board with more than 2 layers, due to the different materials, sizes and other parameters of each layer, the warpage risk in the welding process is also different. Therefore, it is possible to merely select the circuit board layer with high warpage risk for simulation. For example, in the sandwich structured circuit board according to some embodiments, the warpage risk caused by the attachment of the top board 1 with the adapter plate 2 is greater than that caused by the attachment of the adapter plate 2 with the bottom board 3, and thus the warpage process of the top board 1 and the adapter plate 2 may be only simulated in the simulation process.

Figure 5:
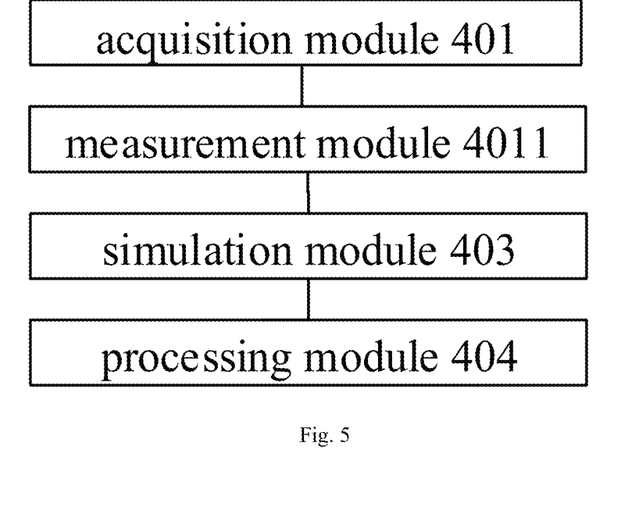
FIG. 5 is a schematic diagram illustrating a welding quality processing device according to some embodiments of the present disclosure.

In some embodiments of the present disclosure, a welding quality processing device is provided. The welding quality processing device includes an acquisition module 401, a simulation module 403 and a processing module 404. The acquisition module 401 is configured to obtain warpage data of each circuit board layer in a multi-layer circuit board under a preset welding temperature change curve. The simulation module 403 is configured to perform simulation according to a stacked state of the multi-layer circuit board and the warpage data to generate a warpage level of each region in the multi-layer circuit board in the stacked state. The processing module 404 is configured to process the multi-layer circuit board according to the warpage level output by the simulation module 403.

In the simulation process, it is necessary to input certain condition information. The acquisition module 401 is configured to obtain the warpage data of each circuit board layer in the multi-layer circuit board under the preset welding temperature change curve. Taking reflow welding of a circuit board as an example, as shown in FIG. 2, a temperature change curve of a complete reflow welding process normally includes T1 to T4 zones as follows. The T1 zone is a preheating zone, which denotes a heating stage. The T2 zone is an infiltrating zone, which denotes a heat preservation stage. The T3 zone is a reflow welding zone, which denotes a welding stage. The T4 zone is a cooling zone, which denotes a cooling stage. In order to perform accurate simulation, the temperature curve needs to be set. It is understood that there should be a margin for temperature change when setting the temperature curve. For example, a fluctuation of ±3° C. may present between the simulated temperature curve and the preset temperature curve to fit the actual production environment.

After the welding temperature change curve is obtained, the acquisition module 401 is configured to obtain the warpage data corresponding to the temperature change curve of each circuit board layer in the multi-layer circuit board. That is, when the multi-layer circuit board is subjected to the corresponding temperature change during the welding process, the warpage data of each region of each circuit board layer at each time point is obtained. It is understood that the warpage data may be obtained by non-contact measurement technology. By simulating and physically building a reflow welding process and operating environmental conditions, a complete historical warpage displacement performance is captured to obtain more realistic warpage data. It is also possible to input specific parameters of the corresponding circuit board and set specific environmental conditions to obtain the warpage data through simulation, and then the warpage data is obtained by the acquisition module 401.

At the same time, given the large scale of the simulation data, the amount of the data may be reduced by selecting warpage characteristic points. For example, the area of the circuit board may be equally divided into 100 square regions by the acquisition module 401, and only the warpage data at a center point of each square region is obtained to reduce the amount of the simulation data. It is understood that other alternative ways of reducing the amount of data may be selected by the person skilled in the art according to actual needs.

As embodiments of the present disclosure relate to the judgment on the comprehensive warpage risk of the multi-layer circuit board in the stacked state, it is necessary to perform simulation by the simulation module 403 according to the stacked state of the multi-layer circuit board and the warpage data to generate the warpage level of each region in the multi-layer circuit board in the stacked state. The warpage data corresponding to the temperature change curve of the multi-layer circuit board is superimposed according to the stacked state. Since the multi-layer circuit board is stacked by more than one times reflow welding, the warpage in the welding process is more prone to affect the quality of the circuit board. It is understood that the present disclosure is not limited to the sandwich structured circuit board, and the warpage risk of a circuit board with two or more layers can also be judged according to the method of the present disclosure.

After the data is simulated by the simulation module 403, fitting data may be obtained, which is the superposition of the warpage data of the multi-layer circuit board. The fitting data reflects the warpage risk of the stacked state of the circuit board during the reflow welding process. The simulation result obtained by the simulation module 403 may be compared with a set standard to generate the warpage level of the multi-layer circuit board in the stacked state. For example, when the warpage value is below 80 μm, a low-risk level is judged, and a low-risk region is marked. When the warpage value is between 80 μm and 120 μm, a middle-risk level is judged, and a middle-risk region is marked, which indicates that although there is a certain risk, the quality of the circuit board may be remedied by adjusting the coverage region and coverage area of copper foil via technological means, such as clamp pressing. When the warpage value is larger than 120 μm, a high-risk level is judged, and a high-risk region is marked, which indicates that such a large warpage degree cannot be remedied, or the required cost is too high. If the reflow welding is performed in this state, the welding joints are prone to cold solder joint or empty solder due to the too large warpage, which makes it difficult to guarantee the quality of the circuit board. At this time, it is necessary to redesign the layout and pattern of the circuit board and adjust the material of the circuit board in an early step, and redesign and modify the high-risk region in a stage previous to the processing stage to avoid the welding risk in this region. After the judgment is completed, the warpage level of each region of the multilayer circuit board in the stacked state is generated. It is understood that the above-mentioned judgment values are only standards for the specific circuit board stack, and are merely serve as an example for better understanding of the present disclosure. It is understood that the judgment standard will vary depend on different circuit board designs and different reflow welding environments, and thus will not be limited in the present disclosure.

After obtaining the warpage level, the multi-layer circuit board is processed according to the warpage level by the processing module 404. For example, a prompt is made for a corresponding region to promote the designer to adjust the parameters. Furthermore, it is also possible to analyze the cause of the warpage level according to the stacked state of the multi-layer circuit board or the obtained welding simulation parameters. For example, possible causes of the warpage may be summarized by machine learning based on historical data to promote the designer to make adjustments. Furthermore, it is also possible to automatically calculate the design parameters. For example, if a residual copper rate in the current region is above 5%, it needs to be adjusted to below 3% to meet the standard. It is understood that the design parameters also include a relative position of the multi-layer circuit board, a material of the multilayer circuit board, and a welding position of a component of the multi-layer circuit board, which are not specifically limited therein.

At the same time, since the simulation can be made for each stage in the temperature curve to obtain the warpage state and judge the warpage level for each temperature state, the entire welding process may be dynamically analyzed according to embodiments of the present disclosure, and the risks in the welding process may be comprehensively grasped.

Through the welding quality processing device according to embodiments of the present disclosure, the warpage level of the circuit board during the welding process may be obtained by simulation before the actual welding, and the warpage risk may be judged, such that the warpage risk may be dynamically analyzed, and the circuit board may be processed based on the warpage level to guarantee the welding quality of the circuit board.

In an embodiment of the present disclosure, obtaining the warpage data of the multi-layer circuit board corresponding to the temperature change curve by the acquisition module 401 includes calling the warpage data corresponding to the characteristic points. The characteristic points include those selected from one or more of a heating stage, a heat preservation stage, a welding stage, and a cooling stage of the welding temperature change curve. In an embodiment, as shown in FIG. 2, in the heating stage T1, the temperature is raised from room temperature to 100° C., and the points of 30° C. and 50° C. are selected as the characteristic points. In the heat preservation stage T2, the temperature is kept in the range of 100° C. to 120° C. for 60 to 100 seconds, and only the point of 100° C. is selected as the characteristic point since the temperature does not change much and the change rate is slow in the heat preservation stage. In the welding stage T3, the temperature is further raised higher than 151° C. for 80 to 120 seconds, and briefly reaches a peak temperature in a range of 190° C. to 200° C. In this stage, welding actually takes place, the solder paste is in a flowing state, and the area of the solder paste changes. At the same time, the temperature changes rapidly and there are both a heating stage and a cooling stage, such that more characteristic points need to be selected to reflect the actual welding state. Some more dense temperature characteristic points, like 150° C., 180° C., 190° C., 195° C., 200° C., 195° C., 190° C., 180° C., 150° C., etc., may be selected with time changes. In the cooling stage T4, the product is cooled and the welding joints are solidified. In this stage, it is critical to control the cooling rate, if the cooling rate is too fast, the assembly may be damaged, if the cooling rate is too slow, the TAL time may be increased to cause fragile welding joints. Therefore, three points of 100° C., 50° C. and 30° C. are selected as the characteristic points. In addition, since the temperature change stages including such as the heating stage, the welding stage and the cooling stage have a greater impact on the warpage of the circuit board, the number of the temperature characteristic points acquired in the welding stage, the heating stage or the cooling stage is greater than that in the heat preservation stage. Through the collection and analysis of the warpage data corresponding to the above 15 temperature characteristic points, the temperature where the warpage risk occurs in the entire temperature curve and the warpage degree may be well reflected.

In an embodiment of the present disclosure, as shown in FIG. 5, the device further includes a measurement module 4011. The measurement module 4011 is configured to obtain a shadow moire distribution diagram of the multi-layer circuit board under a grating through the shadow moire technique using the build reflow welding process and operating environmental conditions, and calculate the relative vertical displacements of multiple positions of the multi-layer circuit board during the welding process according to the shadow moire distribution diagram. Details are described in the related embodiments above, and not elaborated herein.

In an embodiment of the present disclosure, the simulation module 403 is configured to process the warpage data according to the stacked state of the multi-layer circuit board, such as stacking and simulating the warpage data of each circuit board layer to form a fitting surface. As shown in FIG. 4, in addition to simulating the relative vertical displacement surfaces 101 and 102 of object points matched in the stacked state of respective layers of the circuit board, the relative vertical displacements of the surface 101 and the surface 102 at each corresponding point may also be stacked for simulation, the warpage data of the corresponding object points of the two circuit board layers in a vertical direction is determined in the stacked state, and a fitting surface 103 is obtained after the simulation. Among them, the stacking of the data may be the superposition of the relative vertical displacements. It is understood that when the circuit board has more than two layers, the warpage data of two adjacent layers may be superimposed first to obtain a result, and then the warpage data of the third layer may be superimposed to finally obtain the warpage data of the final stacked state.

In an embodiment of the present disclosure, the simulation module 403 is configured to determine the warpage risk of the fitting surface according to a relative value of the fitting surface with respect to the reference value, generate the warpage level of the fitting surface, visualize the warpage level, and output a region having the warpage risk. As shown in FIG. 4, when the fitting surface 103 is simulated, the corresponding warpage level may be generated, and the warpage level may be visualized with such as different gray scales or different colors, such that a new 3D fitting surface is formed, and the region having the warpage risk is output. For example, the region with the high-risk level may be marked in red, the region with the medium-risk level may be marked in yellow, and the region with the low-risk level may be marked in green. Furthermore, the color depth may be one-to-one corresponded to the size of the respective data to form an intuitive view, so that the risk region may be judged more quickly.

In an embodiment of the present disclosure, since the warpage data of the multi-layer circuit board obtained by the shadow moire technique is only the characterization of the warpage state and is affected by various factors in the data acquiring process, the acquisition module 401 may further include the following functions. Before the simulation, welding simulation parameters of the multi-layer circuit board are input to limit the variables, such that the warpage data may be combined with the welding parameters to better complete the welding simulation. The welding parameters include, but are not limited to the following parameters that affect the welding effect: such as one or more of a thickness of each circuit board layer, a distance between circuit board layers of the multi-layer circuit board, a material of the multi-layer circuit board, an area of the multi-layer circuit board, and a coverage area of a copper foil. At the same time, when the kinds of the welding parameters are sufficient enough, the warpage data of the multi-layer circuit board corresponding to the temperature change curve may be obtained without the experiment. This is, there is no need to capture a complete historical warpage displacement performance by simulating and physically building a reflow welding process and operating environmental conditions. The acquisition module 401 may be configured to perform the simulation directly according to the set conditions to obtain the warpage data of the multi-layer circuit board, such that a higher degree of simulation is achieved. Further, the acquisition of the initial data may also be simplified, and the design parameters may be adjusted conveniently in subsequent modifications.

In an embodiment of the present disclosure, since different relative vertical displacements of the warpage may be generated when the measurement module 4011 obtains the warpage data of each circuit board layer of the multi-layer circuit board, the warpage level of each circuit board layer may be preliminarily screened by the acquisition module 401 to obtain a preliminary screened region where the warpage data of each circuit board layer is greater than a preset second threshold, and the preliminary screened region is simulated. For example, the second threshold is preset to a warpage degree of 80 μm, when a certain layer of the circuit board has a region where the warpage data is greater than 80 μm, the region is determined to have a high-risk level and is screened out, and the experimental conditions resulting in the high-risk region are obtained and input into the simulation module 403 for simulation. That is, the acquisition module 401 is configured to preliminary screen the initial data to screen out the parts that need to be simulated or the parts with high warpage level before the multi-layer circuit board is superimposed, thereby further reducing the amount of data to be processed.

In some embodiments of the present disclosure, a circuit board is provided. The circuit board is produced by the method or device as described in the above-mentioned embodiments. As shown in FIG. 3, the circuit board is formed by stacking multiple circuit board layers, and may include a top board 1, an adapter board 2, and a bottom board 3. The adapter board 2 is located between the top board 1 and the bottom board 3. In an embodiment, the adapter board 2 only serves as a connection, and electronic components may be attached to both the front and back surfaces of the top board 1 and the bottom board 3, such that the circuit board may be divided into multiple layers to integrate more components.

In an embodiment of the present disclosure, a surface of one or more layers of the multi-layer circuit board where a component is welded is covered with a copper foil, and an area and/or a coverage region of the copper foil is not equal. The copper foil will be attached to the circuit board due to its good heat dissipation function. However, the residual copper rate of the copper foil (i.e., a ratio of a copper coverage area on a upper surface to a copper coverage area on a lower surface, and it is not necessarily to be 1), the heat dissipation function of the copper foil, the stress generated during the attachment of the copper foil, and differences in the area and coverage region of the copper foil will amplify the warpage of a certain part during the welding process. In this case, it is necessary to make a preliminary risk judgment on the circuit board through the above-mentioned welding quality processing method to reduce the risk involved in the circuit board.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the claimed invention only be limited by the appended claims.

What is claimed is:
1. A welding quality processing method, comprising:
obtaining warpage data of each circuit board layer in a multi-layer circuit board under a preset welding temperature change curve;
performing simulation according to a stacked state of the multi-layer circuit board and the warpage data to gen- erate a warpage level of each region in the multi-layer circuit board in the stacked state; and processing the multi-layer circuit board according to the warpage level.

2. The method according to claim 1, wherein the welding temperature change curve comprises one or more of a heating stage curve, a heat preservation stage curve, a welding stage curve, and a cooling stage curve, and the method further comprises:

acquiring warpage data corresponding to temperature characteristic points of the welding temperature change curve, wherein the number of the temperature characteristic points acquired in the welding stage curve is greater than that of the temperature characteristic points acquired in the heat preservation stage curve.

3. The method according to claim 1, wherein obtaining the warpage data of each circuit board layer in the multi-layer circuit board comprises:

obtaining a shadow moire distribution diagram of the multi-layer circuit board under a grating through a shadow moire technique, and calculating a relative vertical displacement of the multi-layer circuit board during a welding process according to the shadow moire distribution diagram.

4. The method according to claim 3, further comprising:
fitting warpage data of object points matched in the stacked state, comprising:

determining warpage data of corresponding object points of two circuit board layers in a vertical direction in the stacked state; and fitting and superimposing relative vertical displacements in the warpage data to form a fitting surface.

5. The method according to claim 4, further comprising:
obtaining a relative value by comparing the relative vertical displacement of the fitting surface with a reference value;

generating the warpage level of each region of the multi-layer circuit board in the stacked state according to a correspondence between the relative value and a first threshold interval.

6. The method according to claim 1, wherein the multi-layer circuit board comprises a bottom board, an adapter board, and a top board; wherein the multi-layer circuit board is stacked in a sequence of attaching an upper surface of the adapter board to the top board, and attaching a lower surface of the adapter plate to the bottom board.

7. The method according to claim 1, further comprising:
obtaining the warpage data by inputting welding simulation parameters and mapping, wherein the welding simulation parameters comprise one or more of a thickness of each circuit board layer, a distance between circuit board layers of the multi-layer circuit board, a material of the multi-layer circuit board, an area of the multi-layer circuit board, and a coverage area of a copper foil.

8. The method according to claim 1, wherein obtaining the warpage data of each circuit board layer of the multi-layer circuit board further comprises:

obtaining a preliminarily screened region where the warpage data of each circuit board layer is greater than a preset second threshold, and simulating the preliminarily screened region.

9. The method according to claim 1, wherein processing the multi-layer circuit board according to the warpage level comprises adjusting design parameters of the multi-layer circuit board, wherein the design parameters of the multi-layer circuit board comprise one or more of:

a residual copper rate of the multi-layer circuit board;

a relative position of the multi-layer circuit board;

a material of the multi-layer circuit board; and a welding position of a component of the multi-layer circuit board.

10. The method according to claim 1, further comprising:
equally dividing the multi-layer circuit board into a plurality of square regions; and obtaining warpage data at a center point of each square region.

* * * * *